Patented May 9, 1944

2,348,329

UNITED STATES PATENT OFFICE 2,348,329

PROCESS FOR SEPARATING XYLENES

Percy J. Cole and Granville W. Burtt, Philadelphia, Pa., assignors, by mesne assignments, to Allied Chemical & Dye Corporation, a corporation of New York No Drawing. Application June 26, 1940, Serial No. 342,438

4 Claims. (Cl. 260—674)

This application is directed to the separation of meta- and para-xylenes from mixtures thereof.

Xylenes are obtained commercially from various natural sources such as coke-oven distillate and drip oil (the oil which accumulates in gas mains). A xylene oil thus obtained ordinarily contains all three xylenes. A seasonably effective separation of ortho-xylene from this mixture may be made by fractionation of the xylene mixture. Meta- and para-xylenes, however, are so close in boiling points that fractionation is ineffective to bring about separation.

It has been proposed to separate meta- and para-xylene by fractional crystallization of para-xylene, which has the highest melting point of the xylenes. Such separation, however, necessitates cooling the mixed xylenes to temperatures in the neighborhood of −60° C. and the product which then crystallizes contains meta-xylene admixed with para-xylene. To prepare meta- or para-xylene of reasonable purity by such a method requires repeated crystallization and the process is unsatisfactory and expensive because of the difficulties encountered in operating at low temperatures and the number of operations involved.

It has also been proposed to bring about separation of meta- and para-xylenes by a method involving the selective sulfonation of the meta-xylene content of the mixture, separation of the sulfonated meta-xylene from the unsulfonated oil containing primarily para-xylene, sulfonation of the para-xylene-containing oil, addition of hydrochloric acid to the latter sulfonation product to precipitate para-xylene sulfonic acid, washing of the precipitate with hydrochloric acid, and hydrolysis of the resulting para-xylene sulfonic acid. Such a method, however, is unsatisfactory because it requires a very lengthy sulfonation process, the sulfonation is not sufficiently selective, the use of hydrochloric acid introduces a relatively expensive reagent and aggravates corrosion conditions, the yields are low and purity of product is very poor.

It is an object of this invention to provide a new, relatively inexpensive and commercially attractive process for separating meta- and para-xylenes.

We have discovered that a mixture of meta- and para-xylenes may be separated by (1) substantially completely sulfonating the xylene mixture, (2) partially hydrolyzing the mixture of sulfonic acids thus obtained to produce primarily meta-xylene, preferably by steam distillation, and (3) cooling the non-hydrolyzed sulfonic acids from step 2 to precipitate therefrom para-xylene sulfonic acid, which may thereafter be hydrolyzed, for example by steam distillation, to give para-xylene.

Our invention is particularly advantageous in that substantially pure meta-xylene may be obtained by partial hydrolysis of a completely sulfonated industrial meta- and para-xylene fraction and that substantially pure para-xylene sulfonic acid may be crystallized from the non-hydrolyzed residue. A simple process of relatively few operations is thus provided for recovering meta- and para-xylenes from commercial mixtures thereof. A further important feature of our invention is our discovery that para-xylene sulfonic acid may be crystallized merely by cooling a sulfuric acid solution of meta- and para-xylene sulfonic acids, for example the non-hydrolyzed residue from the above-mentioned partial hydrolysis. We have also found that the crystallized para-xylene sulfonic acid is relatively insoluble in cold aqueous sulfuric acid solution of a concentration of from 40% to 70%, preferably about 60% $H_2SO_4$, and such a solution may therefore be used to advantage for washing adhering mother liquor from the crystals.

The process of our invention may be applied to any industrial xylene mixture, for example, the xylene fraction of coke-oven, light oil or the xylene fraction of drip oil. A xylene oil which contains all three xylenes should first be fractionated to separate ortho-xylene, whereby there is obtained a mixture consisting primarily of meta- and para-xylenes along with some impurities such as ethyl benzene, which mixture may then be treated by the process of our invention to obtain substantially pure para- and meta-xylenes. Our process is most advantageously applied to a refractionated meta- and para-xylene mixture boiling from 138° to 140° C., commonly known as nitration xylene.

In carrying out our process the mixture of meta- and para-xylenes is completely sulfonated, for example by agitating the xylene mixture with fuming sulfuric acid or other sulfonating agent effective to sulfonate both the meta- and para-xylenes, in amount sufficient to form the monosulfonic acid of substantially all the hydrocarbon present, the reaction being continued until substantially all the hydrocarbon is monosulfonated and becomes soluble in the sulfonating mixture. When 26% fuming sulfuric acid (oleum containing 26% free $SO_3$) is employed in accordance with the preferred method of practicing our invention, at least about 120 parts by weight of the oleum should be agitated with 100 parts of the crude xylene until the hydrocarbon is substantially all dissolved. In place of fuming sulfuric acid, sulfonating agents such as chlor-sulfonic acid, sulfur trioxide or concentrated sulfuric acid may be used.

The mixture of meta- and para-xylene sulfonic acids thus obtained is then subjected to partial hydrolysis. We have found that meta-xylene sulfonic acid is preferentially hydrolyzed and that substantially pure meta-xylene may thus be obtained by partial hydrolysis of the mixed sulfonic acids. The partial hydrolysis is preferably carried out by steam distillation of the mixed sulfonic acids; i. e. by passing steam into the acid mixture or by adding water to the mixture and boiling to distill off water vapor together with the meta-xylene formed by hydrolysis. The still temperature rises as the hydrocarbon and water vapors pass off during steam distillation. Meta-xylene liberated by hydrolysis of meta-xylene sulfonic acid distills over in substantial amounts at a temperature of about 140° C. By conducting the steam distillation at a moderate rate the greater part of the meta-xylene can be distilled over at about this temperature; with rapid distillation meta-xylene passes over throughout the range of about 140° to 150° C. In this manner from 70% to 80%, preferably about 77% of the initial meta-xylene content of the mixture may be removed.

In order to bring about the desired degree of partial hydrolysis, the steam distillation should be discontinued when the still temperature has risen to between about 140° and 150° C., preferably about 140° C. for moderate rates of steam distillation. The hydrocarbon which distills over under these conditions usually contains more than 90% meta-xylene. A meta-xylene of about 96% purity may be obtained by discarding the first portions distilling over during steam distillation, since the first portions distilling over contain impurities such as paraffin hydrocarbons and ethyl benzene present in the original xylene mixture.

The residue from the above hydrolysis which has been enriched in para-xylene sulfonic acid by the removal of meta-xylene contains, in addition to the para-xylene sulfonic acid, meta-xylene sulfonic acid, sulfuric acid and water. We have found that para-xylene sulfonic acid is sufficiently insoluble in such a mixture that it may be crystallized merely by cooling the mixture. When the above-described partial hydrolysis has been carried out by steam distillation up to about 140°–150° C., the concentration of the residue is optimum for crystallization of para-xylene sulfonic acid. The composition of such a solution is approximately as follows:

| | Per cent |
|---|---|
| Sulfuric acid | 16 |
| Sulfonic acids | 38 |
| Water | 46 |

Upon cooling such a solution, crystallization of para-xylene sulfonic acid begins at a temperature of about 35° C. and is complete at a temperature of about 10° C. At concentrations differing substantially from those above indicated, somewhat lower temperatures would be required for complete crystallization of para-xylene sulfonic acid. Para-xylene sulfonic acid may be crystallized by cooling, in accordance with the process of our invention, from solutions having the following range of composition:

| | Per cent |
|---|---|
| Sulfuric acid | About 10 to 45 |
| Sulfonic acids | About 20 to 70 |
| Water | About 20 to 50 |

The para-xylene sulfonic acid crystallizes in the form of a hydrate. The crystals may be separated by the usual means, for example by filtration on an acid-resistant filter. To avoid carrying over impurities into the para-xylene it is desirable to wash the filtered crystals of the para-xylene sulfonic acid hydrate. Aqueous sulfuric acid may be used most advantageously for this purpose. We have made the surprising discovery that para-xylene sulfonic acid is soluble to the extent of only a fraction of 1% in sulfuric acid of 40% to 70% concentration, and is substantially completely insoluble in 60% sulfuric acid.

The pure para-xylene sulfonic acid crystals are hydrolyzed, for example by mixing with aqueous sulfuric acid and steam distilling up to a still temperature of 190° to 200° C. Para-xylene may thus be obtained of as high a purity as 98%.

The pure meta-xylene and pure para-xylene thus obtained by the process of our invention may be washed with an aqueous alkali, e. g. dilute sodium carbonate solution, to remove sulfur dioxide contained therein.

The mother liquor from the crystallization of the para-xylene sulfonic acid and the wash liquor from the washing of these crystals may be steam distilled at a temperature of 190°–200° C. to recover mixed xylenes which may be treated along with the meta- and para-xylene mixtures entering the process.

The following example is illustrative of the process of our invention. All parts are by weight:

860 parts of nitration xylene obtained from coke-oven light oil (a xylene of boiling range 138°–140° C. containing about 61% meta-xylene and about 25% para-xylene) were agitated for four hours at 110° C. with 1032 parts of 26% fuming sulfuric acid. The mixture was then slowly steam distilled, the temperature not being permitted to rise substantially above 140° C. During the greater part of this operation it was not necessary to supply outside heat for the distillation, since the heat of dilution resulting from the introduction of steam into the concentrated sulfonic and sulfuric acids was sufficient to maintain the temperature. The steam distillation was continued at about 140° C. until substantially no more hydrocarbon passed over in the distillate. The distilled hydrocarbon amounted to 47.1% of the mixed xylene charge and contained 90.7% meta-xylene. A somewhat lower yield of 96% meta-xylene could have been obtained by discarding the forerunnings in the steam distillation. The meta-xylene product was washed with dilute soda to remove sulfur dioxide.

The residue from the steam distillation was cooled to 10° C. with gentle agitation. A mushy crystalline mass was obtained, from which the crystals consisting of para-xylene sulfonic acid hydrate were removed by filtration. After filtration the crystals were washed with 750 parts of 60% sulfuric acid at 10° C., and then mixed with 750 parts of 60% sulfuric acid and steam distilled, the temperature in the still being allowed to rise gradually to 190°–200° C. The para-xylene thus obtained amounted to 15% of the mixed xylene charge and contained 94.5% para-xylene. The para-xylene product was washed with dilute soda to remove sulfur dioxide.

The mother liquor and washings were steam distilled at a temperature of 190°–200° C. to recover mixed xylenes which were added to a succeeding batch of mixed xylenes to be treated in accordance with the process of our invention. The yield of mixed xylenes was 29.1% of the xylene charge. The total recovery was thus 91.2% of the hydrocarbon charge.

The term para-xylene sulfonic acid, as used in the specification and claims, is intended to include the hydrate, which is the form in which the acid crystallizes.

Since certain changes may be made in carrying out the above process without departing from the scope of the invention, it is intended that all matter contained in the above description shall be interpreted as illustrative and not in a limiting sense.

We claim:

1. The process for separating meta-xylene and para-xylene from mixtures thereof which comprises substantially completely sulfonating the xylene mixture, subjecting the completely sulfonated mixture to steam distillation up to a temperature in the range about 140° to 150° C. to effect partial hydrolysis of the sulfonated mixture and form substantially pure meta-xylene as the primary distillation fraction, and cooling the residue from the steam distillation to precipitate directly therefrom substantially pure para-xylene sulfonic acid.

2. The process for separating meta-xylene and para-xylene from mixtures thereof which comprises substantially completely sulfonating the xylene mixture, subjecting the completely sulfonated mixture to steam distillation up to a temperature in the range about 140° to 150° C. to effect partial hydrolysis of the sulfonated mixture and form substantially pure meta-xylene as the primary distillation fraction, cooling the residue from the steam distillation to precipitate directly therefrom substantially pure para-xylene sulfonic acid, separating the precipitated para-xylene sulfonic acid, washing the solid para-xylene sulfonic acid with aqueous sulfuric acid, and hydrolyzing the para-xylene sulfonic acid to obtain substantially pure para-xylene.

3. A process for separating meta-xylene and para-xylene from mixtures thereof which comprises treating the xylene mixture with fuming sulfuric acid to sulfonate substantially completely the xylenes therein, subjecting the sulfonated mixture to steam distillation at a temperature of about 140° C. to effect partial hydrolysis of the sulfonated mixture and form substantially pure meta-xylene as the primary distillation fraction, cooling the residue from the steam distillation to about 10° C. to precipitate directly therefrom substantially pure para-xylene sulfonic acid, separating the precipitated para-xylene sulfonic acid, washing the solid para-xylene sulfonic acid with aqueous sulfuric acid of about 60% concentration, and steam distilling a mixture of the para-xylene sulfonic acid and aqueous sulfuric acid to hydrolyze the para-xylene sulfonic acid and obtain substantially pure para-xylene.

4. A process for separating meta-xylene and para-xylene from an industrial meta- and para-xylene fraction which comprises substantially completely sulfonating the xylene mixture, separating substantially pure meta-xylene by carrying out steam distillation of the resulting mixed xylene sulfonic acids up to an end temperature in the range of about 140° to 150° C. and crystallizing substantially pure para-xylene sulfonic acid directly from the residual mixed sulfonic acids.

PERCY J. COLE.
GRANVILLE W. BURTT.